(12) United States Patent
Yamada (10) Patent No.: US 6,234,047 B1
(45) Date of Patent: May 22, 2001

(54) INTERMITTENT TRANSMISSION MECHANISM

(76) Inventor: Hiromitsu Yamada, 10-16, Shibukawacho 1-chome, Higashiosaka-shi, Osaka (JP)

(*) Notice: Subject to any disclaimer, the term of this patent is extended or adjusted under 35 U.S.C. 154(b) by 0 days.

(21) Appl. No.: 09/402,945

(22) PCT Filed: Jul. 30, 1998

(86) PCT No.: PCT/JP98/03418

§ 371 Date: Oct. 12, 1999

§ 102(e) Date: Oct. 12, 1999

(87) PCT Pub. No.: WO99/06741

PCT Pub. Date: Feb. 11, 1999

(30) Foreign Application Priority Data

Aug. 1, 1997 (JP) .................................................. 9-207632

(51) Int. Cl.[7] .............................. B23Q 16/06; F16H 55/17
(52) U.S. Cl. ................................................. 74/820; 74/436
(58) Field of Search ........................... 74/820, 436, 84 R, 74/813 R (56) References Cited

U.S. PATENT DOCUMENTS 660,351 * 10/1900 Whitehurst ............................. 74/436
3,813,952 * 6/1974 Fehrenbacher ....................... 74/84 R
5,906,134 * 5/1999 Yamada ................................. 74/436

FOREIGN PATENT DOCUMENTS 5529756 2/1980 (JP) .
333255 4/1991 (JP) .
4300445 10/1992 (JP) .

* cited by examiner

*Primary Examiner*—Mary Ann Green
(74) *Attorney, Agent, or Firm*—Webb Ziesenheim Logsdon Orkin & Hanson, P.C.

(57) ABSTRACT

An intermittent transmission mechanism that includes a driving rotating body adapted to rotate around an input shaft and a driven rotating body adapted to rotate around an output shaft is disclosed. The driven rotating body has arcuate recesses and a gear. The driving rotating body has a partial gear adapted to mesh with the gear of the driven rotating body to drivingly rotate the driven rotating body at predetermined angles in an intermittent manner, and a cam portion provided with a rotation restricting surface which moves relatively along arcuate surfaces of the arcuate recesses. Provided around the cam portion of the driving rotating body are guide grooves for guiding rolling elements in contact with the arcuate recesses of the driven rotating body. The partial gear and the cam portion on the driving rotating body are displaced along the axis of rotation, and the gear and the recesses on the driven rotating body are displaced along the axis of rotation.

12 Claims, 8 Drawing Sheets

INTERMITTENT TRANSMISSION MECHANISM

BACKGROUND OF THE INVENTION

1. Field of the Invention

This invention relates to an intermittent transmission mechanism for converting a continuous rotational displacement into an intermittent rotational displacement for transmission.

2. Description of the Prior Art

Figure 8:
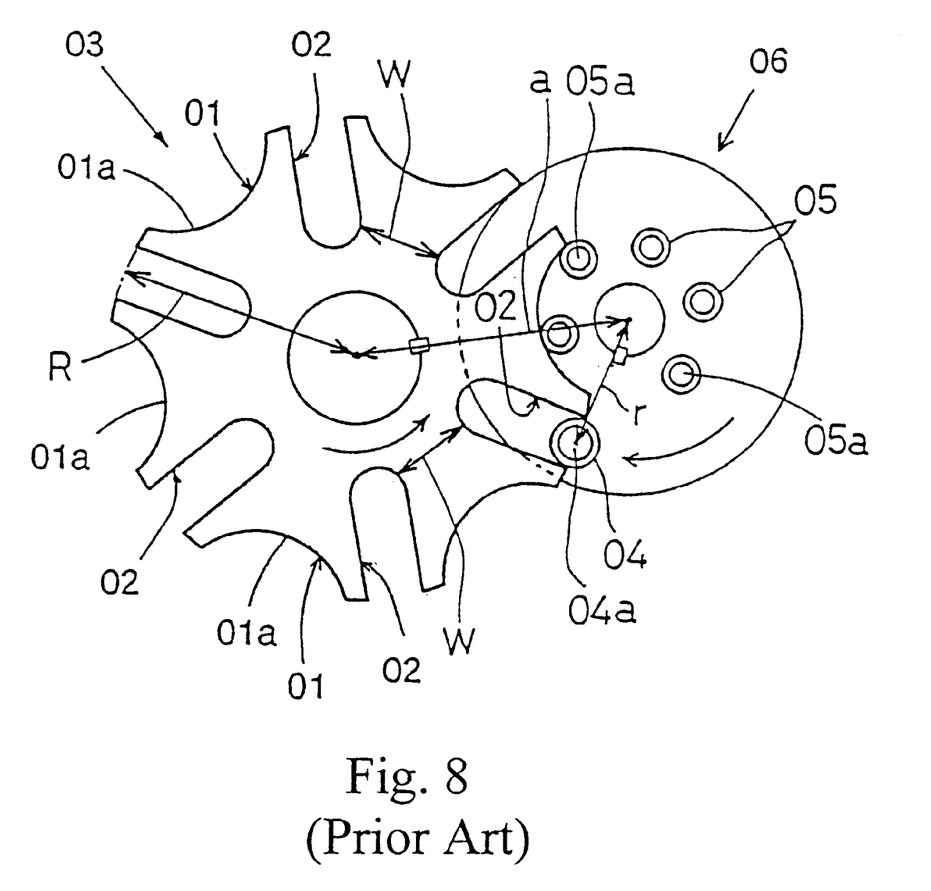
FIG. 8 is a plan view of a conventional intermittent transmission mechanism.

As an example of intermittent transmission mechanism of this type, a Geneva drive mechanism has been proposed which is disclosed in Japanese Utility Model Publication Kokai H6-40507. As shown in FIG. 8 of this reference, this apparatus includes a driven rotor 03 having engageable elements in the form of a plurality of slots 02 opening radially outwardly. The plurality of slots 02 and a plurality of recesses 01 are arranged alternately at predetermined intervals peripherally of the driven rotor 03. Further, a driving rotor 06 has an engaging element in the form of an engaging roller 04 for sequentially engaging the plurality of slots 02 of driven rotor 03 to rotate the driven rotor 03 intermittently by a predetermined angle. The driven rotor 03 has also a plurality of freely rotatable rotating rollers 05 attached thereto for contacting arcuate surfaces 01a of the recesses 01 of driven rotor 03 when the driven rotor 03 stops with the engaging roller 04 disengaged from the slots 02.

In the Geneva drive mechanism having the above construction, the number of slots 02 formed in the driven rotor 03 corresponds to the number of intermittent rotations (hereinafter called dividing number) per complete rotation of driven rotor 03. When the driving rotor 06 rotates to engage the engaging roller 04 in one of the slots 02 of driven rotor 03, the driven rotor 03 is rotated until the engaging roller 04 becomes disengaged from the slot 02. The rotation of driven rotor 03 is stopped until the engaging roller 04 engages a next slot 02 disposed upstream in the direction of rotation of the slot 02 from which the engaging roller 04 is disengaged When the rotation of driven rotor 03 is stopped, the rotating rollers 05 of driving rotor 06 rotate in contact with the arcuate surface 01a of non-drive recess 01 of driven rotor 03, and move with the driving rotor 06 along the arcuate surface 01a.

With the conventional intermittent transmission mechanism in the form of a Geneva drive mechanism, when the driven rotor 03 is stopped, an excessive workload on an output line of driven rotor 03 may be transmitted back to the driven rotor 03 as a strong torque. This strong torque reaction concentrates on support axes 05a of the rotating rollers 05 of driving rotor 06 contacting the arcuate surface 01a of non-drive recess 01 of driven rotor 03, or concentrates on a proximal portion of driven rotor 03 lying between the slots 02 adjacent each other in the direction of rotation and having a minimum width W in the direction of rotation. The support axes 05a or the proximal portion with the minimum width could be broken.

When the driven rotor 03 is rotated intermittently and the excessive workload on the output line of driven rotor 03 acts as a strong reaction on the driven rotor 03, the reaction concentrates on a support axis 04a of the engaging roller 04 of driving rotor 06 engaged in a slot 02 of driven rotor 03. Thus, the support axis 04a could be broken.

Therefore, in case a great workload occurs on the output line of driven rotor 03, the support axis 04a of engaging roller 04 may be formed with an increased diameter to increase the maximum permissible stress of support axis 04a. In this case, however, where only the diameter of support axis 04a is simply enlarged, the diameter of engaging roller 04 also is inevitably enlarged. As a result, the slots 02 have an enlarged opening width in the direction of rotation, and the minimum width W of the proximal portions becomes correspondingly small. Actually, therefore, it is necessary to enlarge both a maximum radius R of driven rotor 03 and a distance r from a rotational axis of driving rotor 06 to a center axis of engaging roller 04. This has resulted in the enlargement of the intermittent transmission mechanism.

In addition, an increase in the number of slots 02 formed in the driven rotor 03, i.e. the dividing number, reduces an angle of rotation from engagement to disengagement of engaging roller 04 into/from a slot 02 and an engaging depth radially of the direction of rotation. This results in an increase in the maximum radius R of driven rotor 03, thereby enlarging the intermittent transmission mechanism. Conversely, a decrease in the dividing number increases the angle of rotation from engagement to disengagement of engaging roller 04 into/from a slot 02 and the engaging depth radially of the direction of rotation. This reduces the width of the minimum width proximal portions of the driven rotor, which may cause breakage as noted hereinbefore.

This invention has been made having regard to the state of the art noted above, and its object is to provide an intermittent transmission mechanism, with a devised transmission structure of a driving rotor and a driven rotor, for allowing the dividing number to be set as desired while ensuring improved strength to withstand a workload and a compact construction, and for stopping rotation of the driven rotor with increased precision.

SUMMARY OF THE INVENTION

To fulfill the above object, an intermittent transmission mechanism according to this invention comprises a driving rotor supported to be rotatable about an axis of an input shaft, and a driven rotor supported to be rotatable about an axis of an output shaft parallel to said axis of the input shaft, said driven rotor including a member defining arcuate recesses, and an engageable element, said driving rotor including an engaging element for engaging said engageable element of the driven rotor to rotate said driven rotor intermittently by a predetermined angle, and a cam with a rotation regulating surface movable relative to and along arcuate surfaces of said recesses when said driven rotor is stopped; which is characterized in that said engaging element of the driving rotor is displaced relative to the rotation regulating surface axially of said input shaft, and said engageable element of the driven rotor is displaced relative to said member defining said recesses axially of said output shaft, said engageable element of the driven rotor being in form of a gear defining teeth arranged at predetermined intervals throughout a circumference thereof, and said engaging element of the driving rotor being in form of a partial gear having teeth for meshing with said gear.

According to the above characteristic construction, the partial gear acting as the engaging element of the driving rotor and the partial gear acting as the engageable element of the driven rotor meshed with each other rotate the driven rotor intermittently by a predetermined angle. The two gears mesh in a fixed range radially of the direction of rotation even when the circumferential length of the partial gear (number of teeth) is varied according to the dividing number.

Moreover, only the thickness in the direction of the rotational axes has to be considered to assure strength of the teeth. There is no possibility, as in the case of a conventional Geneva drive mechanism, of the strength varying with variations in the radial length of slots resulting from variations in the dividing number, or no need to increase the diameters of the driving rotor and driven rotor for securing strength.

Moreover, since the rotation regulating surface of the driving rotor and the non-driven recesses of the driven rotor are displaced in the direction of the rotational axes from the partial gear acting as the engaging element of the driving rotor and the gear acting as the engageable element of the driven rotor, the meshing between the two gears never adversely affects the intermittent rotation even where the non-driven recesses have a maximum outside diameter of the driven rotor is larger than the outside diameter of the gear. The arcuate surface of a non-driven recess and the rotation regulating surface of the cam can contact each other over a longer length in the direction of relative rotation than where, for example, the driven rotor defines the gear for meshing with the partial gear of the driving rotor arranged alternately in the circumferential direction with the non-driven recesses in the same plane. This is effective to suppress clattering in the direction of forward rotation and in the direction of backward rotation of the driven rotor when the rotor is stopped.

Consequently, the dividing number may be set as desired while improving the strength to withstand workload and downsizing the intermittent drive mechanism. The driven rotor may be stopped with increased precision.

In a preferred embodiment of this invention, said input shaft of said driving rotor has an angular velocity change mechanism assembled thereto for minimizing an angular velocity of said driven rotor when the engaging element of the driving rotor begins to engage the engageable element of the driven rotor and ends the engagement.

According to the above characteristic construction, the driving rotor rotates so as to minimize the angular velocity of the driven rotor when the engagement starts. Thus, little loss of collision energy occurs upon start of engagement between the partial gear acting as the engaging element and the gear acting as the engageable element, and the driven rotor may be rotated smoothly with correspondingly little noise.

The driving rotor rotates to minimize the angular velocity of the driven rotor again when the engagement ends. This reduces the inertia force of the driven rotor upon termination of the engagement between the partial gear acting as the engaging element and the gear acting as the engageable element. Thus, the driven rotor may be stopped smoothly.

Preferably, said cam of said driving rotor defines an annular groove for holding a plurality of rolling elements, to be rotatable and for rolling circulation, for contacting said arcuate surfaces of the recesses of the driven rotor.

According to the above characteristic construction, when the driven rotor is stopped rotating intermittently, the plurality of rolling elements supported in the annular groove of the cam of the driving rotor contact the arcuate surface of a non-driven recess of the driven rotor, and circulate while rotating along the annular groove. In a conventional intermittent transmission mechanism, the cam is in the form of rotating rollers rotatably supported on support axes to reduce the frictional force occurring between the arcuate surface of a non-driven recess and the rotation regulating surface of the cam in order to rotate the driving rotor smoothly with little possibility of seizure and clattering. The frictional force between the rotating rollers and the support axes also is now eliminated, and the driving rotor may be rotated smoothly with little possibility of seizure and clattering.

As a result, the intermittent transmission mechanism has an extended life and energy saving is promoted In a preferred embodiment of this invention, said arcuate surfaces of the non-driven recesses of the driven rotor define guide grooves for receiving said rolling elements.

According to the above characteristic construction, a positional adjustment of the driving rotor and driven rotor is effected only by fitting the rolling elements in the guide groove. Thus, an assembling operation may be carried out simply and efficiently.

Preferably, said annular groove is constructed in a relative rotation allowing surface portion of a circumferential surface of said cam, which allows rotation relative to said driven rotor, not to expose the rolling elements from said annular groove in time of intermittent rotation of the driven rotor with said engageable element engaged by the engaging element.

According to the above characteristic construction, a reduced range of the annular groove is vulnerable to entry of dust and the like, compared with a construction where the rolling elements are exposed throughout the circumference of the annular groove. This is effective to check defective rotation and defecting rolling of the rolling elements due to entry to the annular groove of dust and the like.

Where said rolling elements are balls, adjacent rolling elements contact one another in a reduced range, compared with cylindrical elements with opposite ends rounded to semispherical shape. Thus, the rolling elements may rotate and roll with increased smoothness.

Other features and advantages of this invention will be apparent from the following description and drawings illustrating embodiments of the invention.

BRIEF DESCRIPTION OF THE DRAWINGS

FIG. 4 (*a*) is a front view of the intermittent transmission mechanism in time of an engaging element engaging an engageable element;

FIG. 4 (*b*) is a front view of the intermittent transmission mechanism with the driven rotor rotated intermittently;

FIG. 5 (*a*) is a front view of the intermittent transmission mechanism with the engaging element disengaged from the engageable element;

FIG. 5 (*b*) is a front view of the intermittent transmission mechanism with the driven rotor stopped.

FIG. 6 (*a*) is a view showing variations in angular velocity of an input shaft of an angular velocity change mechanism;

FIG. 6 (*b*) is a view showing variations in angular velocity of an intermediate shaft of the angular velocity change mechanism;

FIG. 6 (*c*) is a view showing variations in angular velocity of a tubular output shaft of the angular velocity change mechanism;

FIG. 6 (*d*) is a view showing variations in angular velocity of an output shaft of the angular velocity change mechanism;

DETAILED DESCRIPTION OF THE PREFERRED EMBODIMENTS

FIGS. 1–6 show an intermittent transmission mechanism in a preferred embodiment of this invention, which includes a driving rotor 6 and a driven rotor 3 supported to be rotatable about parallel axes. The driven rotor 3 includes arcuate recesses 1 and an engageable element 2. The driving rotor 6 includes an engaging element 4 for engaging the engageable element 2 of driven rotor 3 to rotate the driven rotor 3 intermittently by a predetermined angle, and a cam 5 having a rotation regulating surface 5a movable along and relative to arcuate surfaces 1a of the recesses 1 when the driven rotor 3 is stopped.

Figure 1:
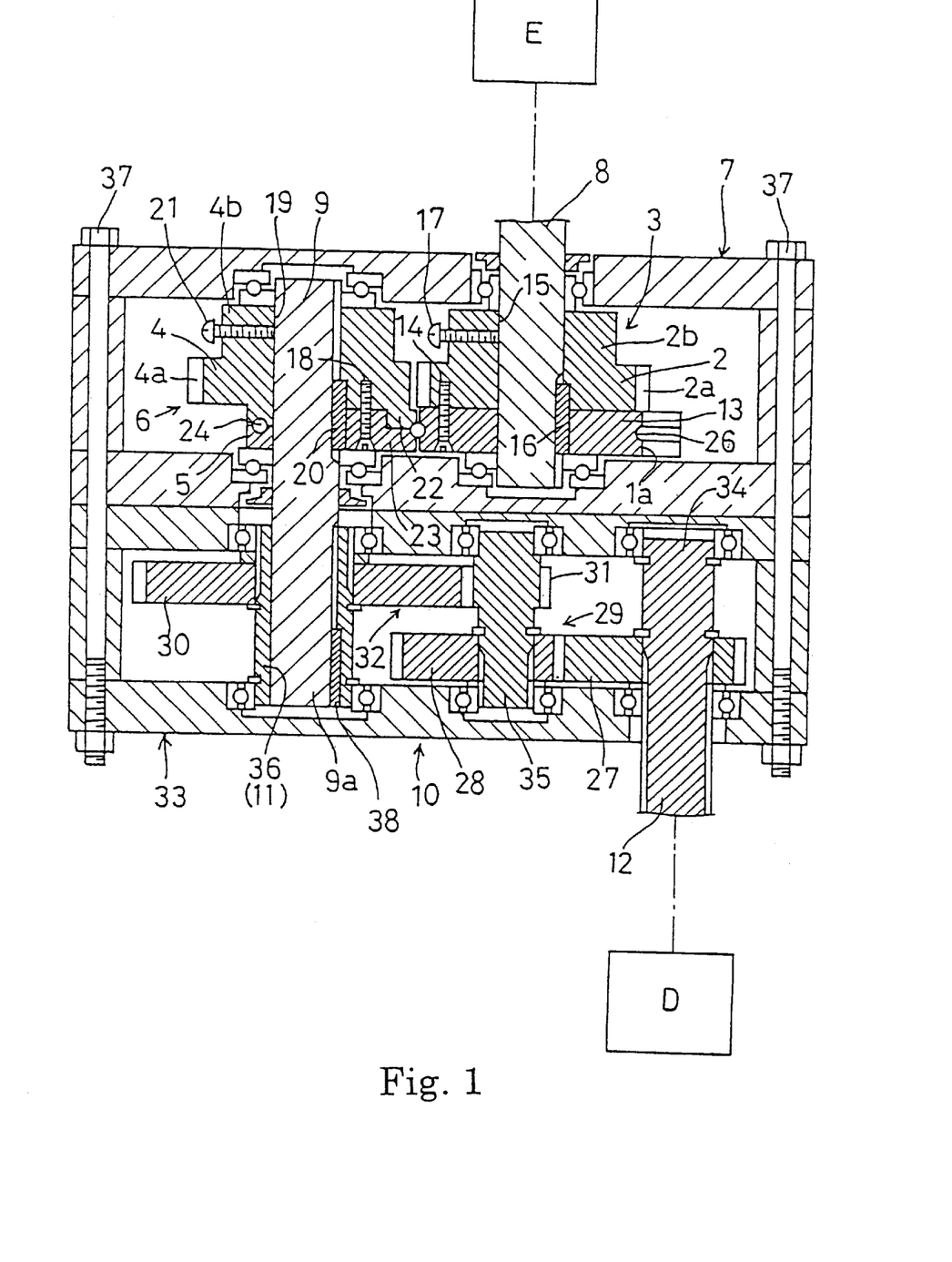
FIG. 1 is a sectional view showing an intermittent transmission mechanism in a preferred embodiment of this invention.
Figure 2:
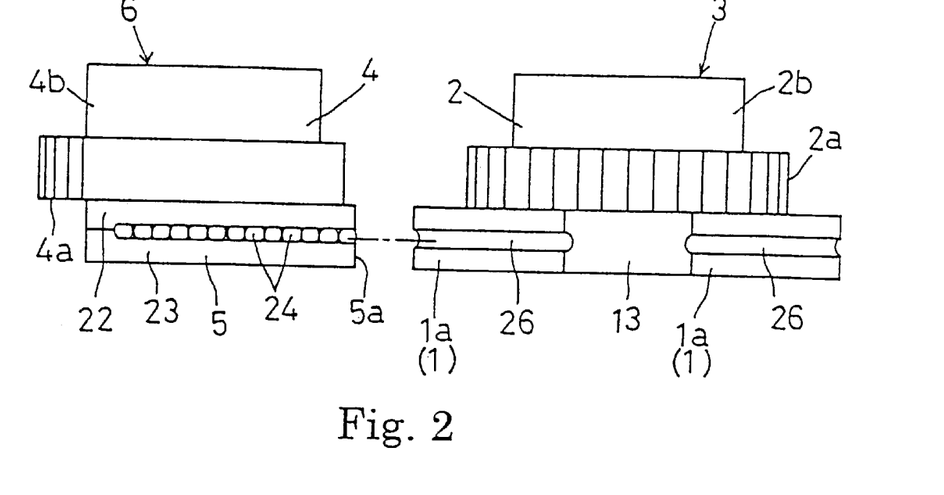
FIG. 2 is a side view of a driven rotor and a driving rotor.

As shown in FIG. 1, the driven rotor 3 is rotatably supported in a case 7 through an output shaft 8. The driving rotor 6 is rotatably supported in the case 7 through an input shaft 9.

A portion of input shaft 9 projecting from the case 7 acts as an input portion 9a of driving rotor 6. The input portion 9a has an angular velocity change mechanism 10 detachably assembled thereto for minimizing an angular velocity of driven rotor 3 when the engaging element 4 of driving rotor 6 and the engageable element 2 of driven rotor 3 begin to engage each other and disengage from each other. That is, the angular velocity change mechanism 10 has an output portion 11 thereof coupled to the input portion 9a of input shaft 9 to be rotatable together.

Further, the angular velocity change mechanism 10 has an input portion 12 thereof to which an output portion (not shown) of a drive system D having a drive actuator such as an electric motor or hydraulic motor may be coupled to be rotatable together. Rotational output from the drive system D is transmitted to the driving rotor 6 through the angular velocity change mechanism 10 and input shaft 9 to rotate the driving rotor 6. In addition, intermittent rotation of driven rotor 3 rotated by the driving rotor 6 is transmitted through the output shaft 8 to an input portion (not shown) of a processing apparatus E for indexing work, for example.

As shown in FIGS. 1–5, the driven rotor 3 includes a rotating element 13 having the non-driven arcuate recesses 1 of identical shape formed in four positions at predetermined intervals along a direction of rotation (circumferential direction), and a gear acting as the engageable element 2 having teeth 2a formed at predetermined intervals throughout the circumference thereof. These rotating element 13 and gear 2 are disposed adjacent each other in the direction of a rotational axis and rigidly connected to each other by bolts 14, and define central bores 15 for receiving the output shaft 8.

That is, the gear 2 of driven rotor 3 is displaced from the non-driven recesses 1 in the axial direction of output shaft 8.

The driven rotor 3 and output shaft 8 are coupled to each other through a key 16 to be rotatable together. A screw 17 is turned in tight toward the output shaft 8 from outside a boss 2b formed integral with the gear 2 to retain the output shaft 8 in the driven rotor 3.

Each of the rotating element 13 and gear 2 constituting the driven rotor 3 is formed of high-carbon chromium bearing steel (SUJ2). The arcuate surfaces of non-driven recesses 1 of rotating element 13 and teeth 2a of gear 2 are quench hardened.

As shown in FIGS. 1–6, the driving rotor 6 includes the cam 5, and a partial gear acting as the engaging element 4 and having teeth 4a for engaging the gear 2. These cam 5 and partial gear 4 are disposed adjacent each other in the direction of a rotational axis and rigidly connected to each other by bolts 18, and define central bores 19 for receiving the input shaft 9.

That is, the partial gear 4 of driving rotor 6 is displaced along the axis of input shaft 9 relative to the rotation regulating surface 5a of cam 5, so that the partial gear 4 of driving rotor 6 may mesh with the gear 2 of driven rotor 3 and the rotation regulating surface 5a of cam 5 of driving rotor 6 be movable along and relative to the recesses 1 of rotating element 13 of driven rotor 3.

The number of teeth 4a formed on the partial gear 4 of driving rotor 6 is selected such that one rotation of partial gear 4 causes an intermittent rotation by 90 degrees of the gear 2 of driven rotor 3. That is, the angle of one intermittent rotation of driven rotor 3 is set to 90 degrees, and the number of intermittent movements, ie. the dividing number, per complete rotation of driven rotor 3 is set to four.

Specifically, the gear diameter of partial gear 4 is the same as the gear diameter of gear 2 of driven rotor 3. Forward ends of teeth 4a disposed at opposite ends of partial gear 4 in the direction of rotation are cut out to avoid an unnecessary meshing at the beginning and end of meshing between partial gear 4 and gear 2. The teeth 4a of partial gear 4 are formed peripherally of the partial gear 4 in a range of 90 degrees about the rotational axis of driving rotor 6, which corresponds to the angle of intermittent rotation of driven rotor 3.

The driving rotor 6 and input shaft 9 are coupled to each other through a key 20 to be rotatable together. A screw 21 is turned in tight toward the input shaft 9 from outside a boss 4b formed integral with the partial gear 4 to retain the input shaft 9 in the driving rotor 6.

Each of the cam 5 and partial gear 4 constituting the driving rotor 6 is formed of high-carbon chromium bearing steel (SUJ2). The teeth 4a of partial gear 4 are quench hardened.

Figure 4A:
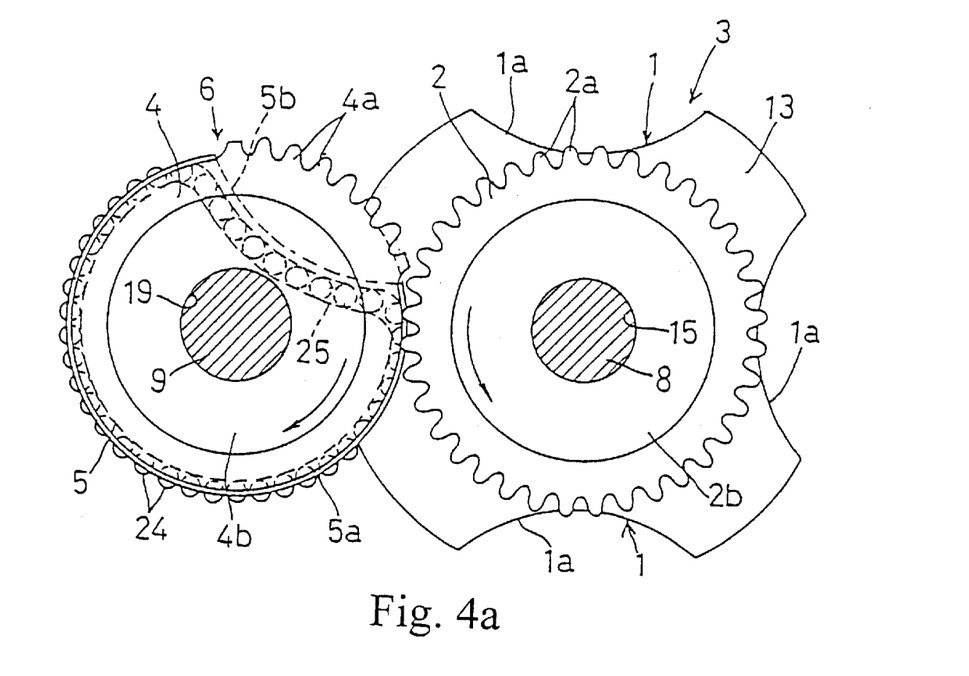
Figure 4B:
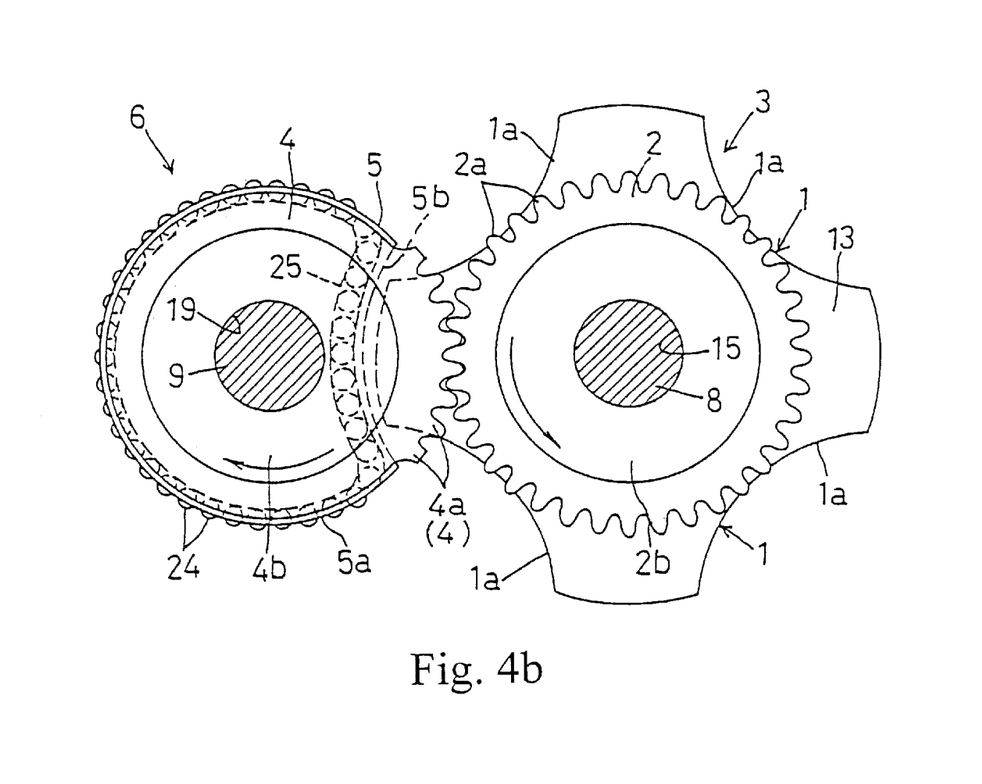

As shown in FIGS. 4 (a) and (b), the driving rotor 6 rotates the driven rotor 3 intermittently by 90 degrees per complete rotation of driving rotor 6 through meshing between the teeth 4a of partial gear 4 of driving rotor 6 and the teeth 2a of gear 2 of driven rotor 3. As shown in FIGS. 4 (c) and (d), when the teeth 4a of partial gear 4 are disengaged from the teeth 2a of gear 2, the cam 5 of driving rotor 6 enters a non-driven recess 1 of driven rotor 3. The rotation regulating surface 5a of cam 5 moves along and relative to the arcuate surface 1a of non-driven recess 1 to stop the intermittent rotation of driven rotor 3 until the partial gear 4 engages the gear 2 again.

The cam 5 has a relative rotation allowing surface 5b for avoiding contact between the cam 5 and the rotating element 13 of driven rotor 3 to allow a relative rotation of driven rotor 3 and driving rotor 6 in time of intermittent rotation of driven rotor 3 with the partial gear 4 of driving rotor 6 meshed with the gear 2 of driven rotor 3.

As shown in FIGS. 2–5, the rotation regulating surface 5a of cam 5 of driving rotor 6 is in the form of an arcuate surface about the rotational axis of driving rotor 6. The rotation regulating surface 5a has a slightly smaller radius than the arcuate surfaces 1a of non-driven recesses 1 of driven rotor 3. The relative rotation allowing surface 5b of cam 5 is in the form of a curved recess continuous with opposite ends in the circumferential direction of rotation regulating surface 5a, and disposed opposite the rotation regulating surface 5a across the rotational axis. The cam 5 is approximately crescent-shaped as seen in the direction of the rotational axis.

Figure 3:
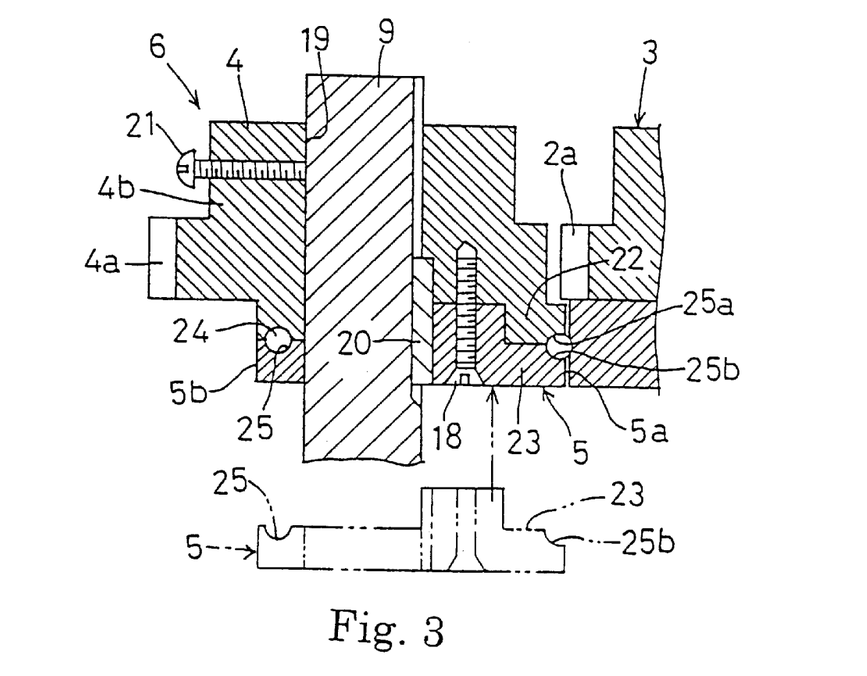
FIG. 3 is an enlarged sectional view of a cam.

As shown in FIG. 3, the cam 5 has a split construction including a female cam member 22, and a male cam member 23 fitted in the female cam member 22 in the direction of the rotational axis and fixed thereto by the bolt 18 integrally connecting the cam 5 and partial gear 4.

The pair of cam members 22 and 23 opposed to each other in the direction of the rotational axis has grooves 25a and 25b of arcuate section formed in opposed surfaces thereof to form an annular groove 25 for rotatably and circulatably holding balls 24 formed of high-carbon chromium bearing steel (SUJ2) and acting as a plurality of rolling elements. The annular groove 25 is formed to be continuous in an approximately crescent-shape extending along the rotation regulating surface 5a and relative rotation allowing surface 5b.

The annular groove 25 is opened radially outwardly in a position corresponding to the rotation regulating surface 5a. Surfaces of balls 24 exposed and protruding radially outwardly from the rotation regulating surface 5a of cam 5 through this opening contact the arcuate surfaces 1a of non-driven recesses 1 of driven rotor 3 when the driven rotor 3 is stopped.

The opening of annular groove 25 has a width along the direction of the rotational axis which is smaller than the diameter of balls 24, to prevent the balls 24 from falling out of the annular groove 25 through this opening.

The annular groove 25 is in the form of a tunnel inside the cam 5 adjacent the relative rotation allowing surface 5b, so as not to expose the balls 24 from the relative rotation allowing surface 5b.

Further, as clearly seen from FIG. 4 (a), for example, the annular groove 25 is shaped, in plan view, to allow the balls 24 or other rolling elements to circulate smoothly in the circumferential direction. Specifically, the annular groove 25 has a minimum radius of curvature larger than the radius of the rolling elements represented by the balls 24.

The arcuate surfaces 1a of non-driven recesses 1 of driven rotor 3 have guide grooves 26 of semicircular arc section formed throughout the circumferential lengths thereof for fitting the balls 24 in line contact, along a direction crossing the direction of rotation of cam 5, with surfaces of balls 24 exposed from the rotation regulating surface 5a. As shown in FIG. 1, the angular velocity change mechanism 10 includes a non-circular gear mechanism 29 having a pair of elliptic gears 27, 28 of the same shape, and a reduction mechanism 32 having a pair of large and small gears 30, 31, which are disposed in a gear case 33.

One of the elliptic gears 27 of non-circular gear mechanism 29 is mounted on and rotatable with an input shaft 34 rotatably supported in the gear case 33. The other elliptic gear 28 of non-circular gear mechanism 29 and the small gear 31 of reduction mechanism 32 are mounted on and rotatable with an intermediate shaft 35 rotatably supported in the gear case 33. Further, the large gear 30 of reduction mechanism 32 is mounted on and rotatable with a tubular output shaft 36 rotatably supported in the gear case 33. The two elliptic gears 27, 28 are meshed with each other, and the pair of large and small gears 30, 31 are meshed with each other.

The large gear 30 of reduction mechanism 32 has a gear diameter four times the gear diameter of small gear 31. Thus, the small gear 31 makes four rotations while the large gear 30 makes one rotation.

The angular velocity change mechanism 10 is assembled by inserting the input portion 9a of input shaft 9 of driving rotor 6 into the tubular output shaft 36 of reduction mechanism 32 and detachably fixing the gear case 33 to the case 7 with bolts 37. That is, the tubular output shaft 36 acts as the output portion 11 of angular velocity change mechanism 10.

Further, the input portion 9a of input shaft 9 of driving rotor 6 and the tubular output shaft 36 of angular velocity change mechanism 10 are interconnected to be rotatable together through a key 38.

A portion of the input shaft 34 of angular velocity change mechanism 10 projecting from the gear case 33 acts as the input portion 12 of angular velocity change mechanism 10. An output portion of drive system D is coupled to this input portion 12 to be rotatable together.

The angular velocity change mechanism 10 is constructed such that, when the input shaft 34 is rotated at a fixed angular velocity by the drive system D as shown in the angular velocity variation curve in FIG. 6 (a), the angular velocity of intermediate shaft 35 is varied by the non-circular gear mechanism 29 approximately in a sign curve as shown in the angular velocity variation curve in FIG. 6 (b). The small gear 31 of reduction mechanism 32 rotates approximately at an angular velocity following the sign curve. While the small gear 31 makes four rotations, the large gear 30 makes one rotation. That is, as shown in the angular velocity variation curve in FIG. 6 (c), the angular velocity of large gear 30 varies in four cycles while the large gear 30 makes one rotation. The variations in the angular velocity of large gear 30 are transmitted as they are to the input shaft 9 of driving rotor 6 through the tubular output shaft 36 of angular velocity change mechanism 10.

Consequently, during one of the four cycles of the variations in the angular velocity occurring while the large gear 30 makes one rotation, the teeth 4a of partial gear 4 of driving rotor 6 mesh with the teeth 2a of gear 2 of driven rotor 3, thereby rotating the driven rotor 3 by 90 degrees. During the remaining three cycles, the teeth 4a of partial gear 4 are disengaged from the teeth 2a of gear 2, to stop rotation of driven rotor 3.

Moreover, the input portion 9a of input shaft 9 of driving rotor 6 and the tubular output shaft 36 of angular velocity change mechanism 10 are assembled such that, as shown in the angular velocity variation curve in FIG. 6 (d), the teeth 4a of partial gear 4 of driving rotor 6 and the teeth 2a of gear 2 of driven rotors 3 begin to mesh when the angular velocity of tubular output shaft 36 of angular velocity change mechanism 10 is minimized, and the meshing between these teeth 4a of partial gear 4 and the teeth 2a of gear 2 ends when the angular velocity of tubular output shaft 36 is minimized next. The angular velocity of driven rotor 3 is at a minimum when the teeth 4a of partial gear 4 and the teeth 2a of gear 2 begin to mesh and end the meshing.

According to the intermittent transmission mechanism having the above construction, when the driving rotor 6 is rotated by output from the drive system D through the angular velocity change mechanism 10, teeth 4a of partial gear 4 mesh with the teeth 2a of gear 2 of driven rotor 3 as noted above to produce 90-degree intermittent rotations.

In time of the intermittent rotation of driven rotor 3, as shown in FIG. 4 (b), the relative rotation allowing surface 5b of cam 5 is opposed to the rotating element 13 to allow a relative rotation between the cam 5 and rotating element 13.

Subsequently, the teeth 4a of partial gear 4 become disengaged from the teeth 2a of gear 2, and the rotation of driven rotor 3 is stopped until the partial gear 4 makes one rotation and the teeth 4a of partial gear 4 and the teeth 2a of gear 2 mesh again.

Figure 5A:
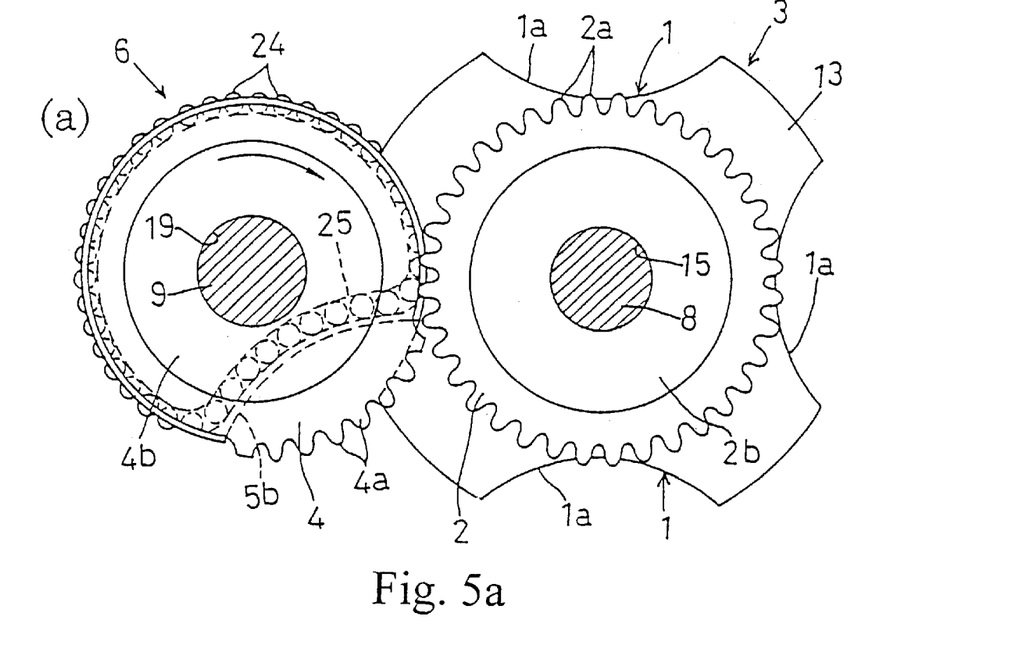
Figure 5B:
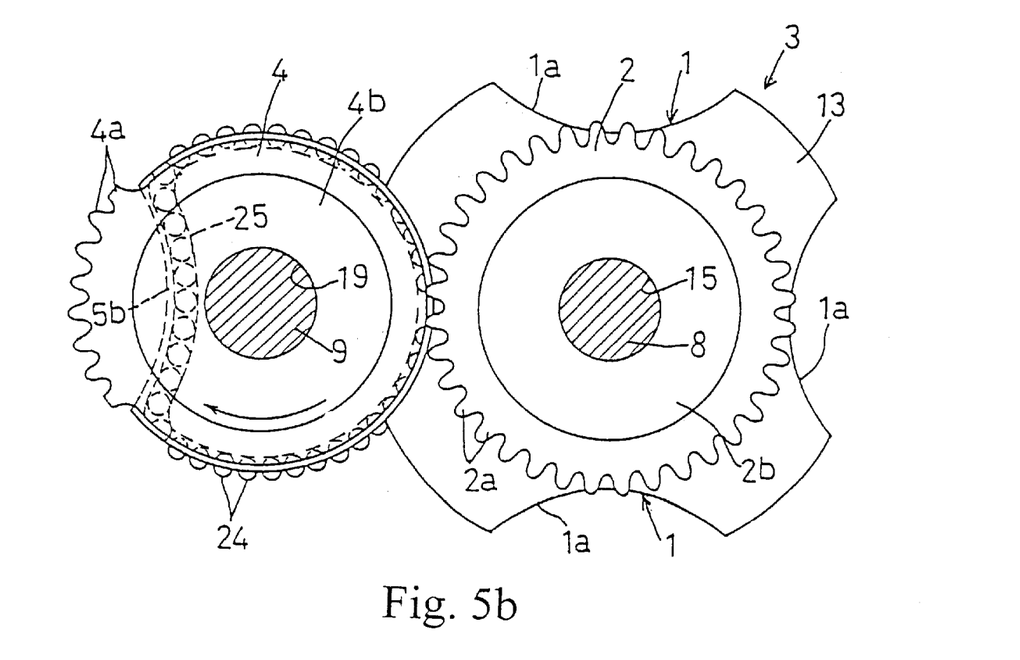
Figure 6A:
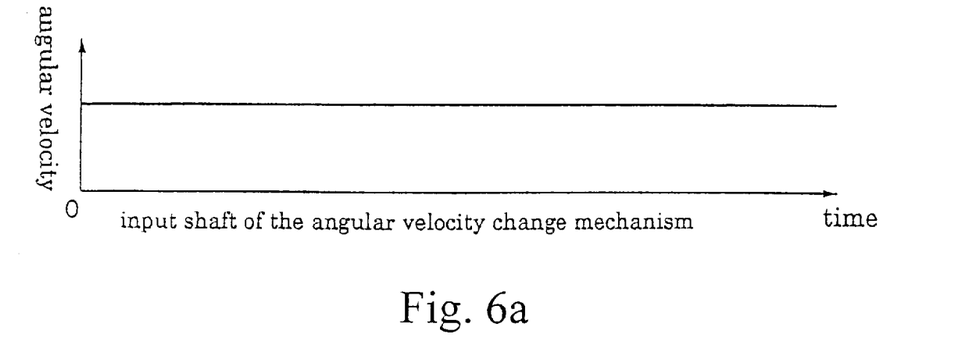
Figure 6B:
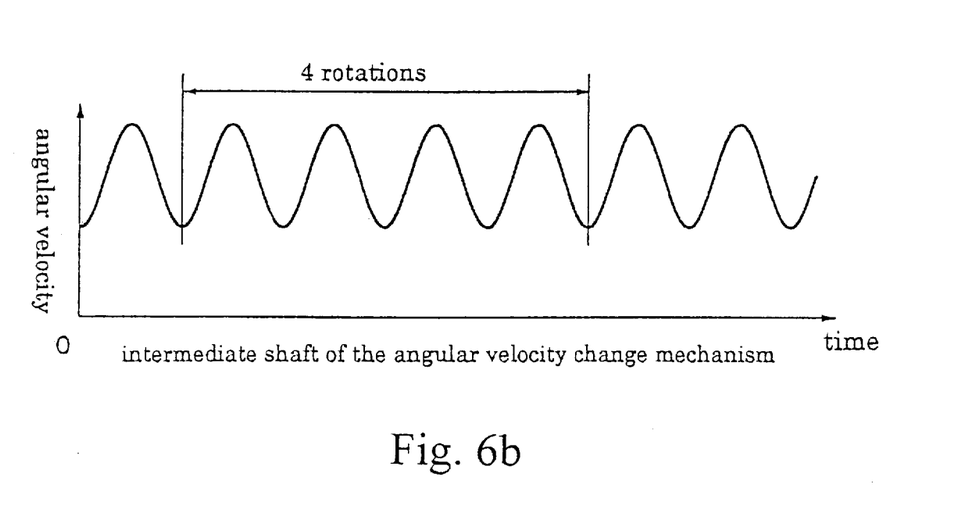
Figure 6C:
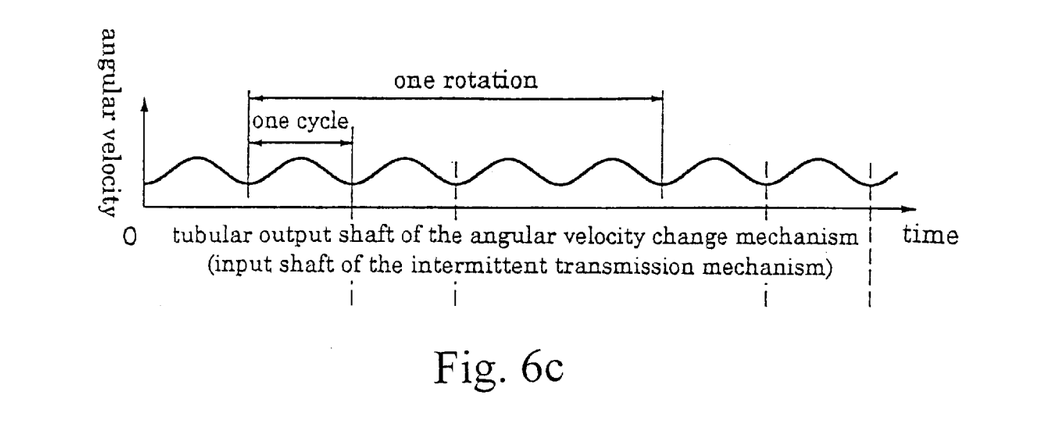
Figure 6D:
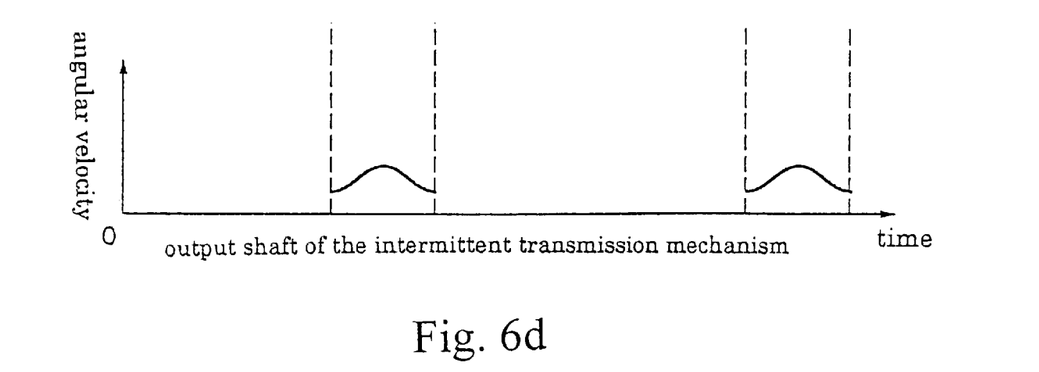

When the driven rotor 3 is stopped, as shown in FIG. 4 (a) and FIGS. 5 (c) and (d), the rotation regulating surface 5a of cam 5 is opposed and close to the arcuate surface 1a of a non-driven recess 1 of driving rotor 6 over a length at least a half of the circumferential length thereof. During this period, the rotation regulating surface 5a of cam 5 lies adjacent the arcuate surface 1a of non-driven recess 1 over a length at least a half of the circumferential length thereof, and the plurality of balls 24 supported in the annular groove 25 of cam 5 and exposed from the rotation regulating surface 5a fit in line contact with the guide groove 26 formed in the arcuate surface 1a of non-driven recess 1. This regulates free rotation in forward and backward directions of driven rotor 3.

The balls 24 fitting in line contact with the guide groove 26 formed in the arcuate surface 1a of non-driven recess 1 when the driven rotor 3 is stopped circulate in the annular groove 25 while rotating under contact pressure and rolling along the annular groove 25. Thus, hardly any frictional force acts between facing surfaces of the arcuate surface 1a of non-driven recess 1 and the rotation regulating surface 5a of cam 5.

Figure 7:
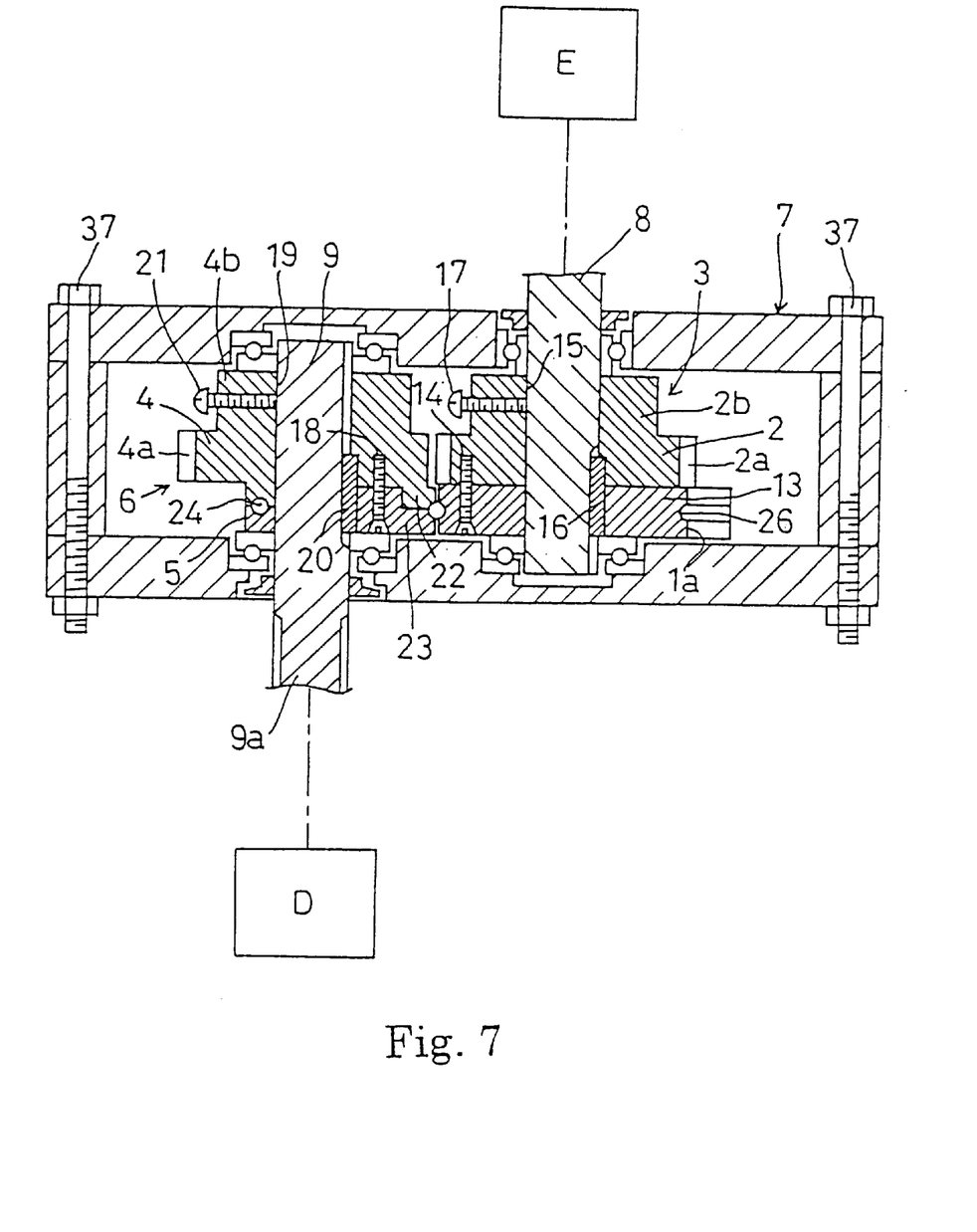
FIG. 7 is a sectional view showing an intermittent transmission mechanism in another embodiment of this invention.

Another embodiment of this invention will be described next with reference to FIG. 7.

In the foregoing embodiment, the angular velocity change mechanism 10 is detachably assembled to the input portion 9a of input shaft 9 of driving rotor 6. As shown in FIG. 7, an output portion (not shown) of drive system D including a drive actuator such as an electric motor or hydraulic motor may be connected to the input portion 9a of input shaft 9 of driving rotor 6 to be rotatable together.

The other aspects of the construction are the same as in the foregoing embodiment.

The following constructions may be added as variations of the two embodiments described above.

In each embodiment described above, the angle of one intermittent drive of driven rotor 3 is set to 90 degrees, and the dividing number of driven rotor 3 to four. These are not limitative. By varying the number of teeth 4a of the partial gear acting as the engaging element 4 of driving rotor 6 and the number of non-driven recesses 1 formed in the driven rotor 3, the angle of one intermittent drive of driven rotor 3 may be set to 120 degrees, the number of non-driven recesses 1 formed in the driven rotor 3 to three and the dividing number of driven rotor 3 to three, for example, or the angle of one intermittent drive of driven rotor 3 may be set to 60 degrees, the number of non-driven recesses 1 formed in the driven rotor 3 to six, and the dividing number of driven rotor 3 to six.

In the preferred embodiments described above, the speed increasing ratio of the reduction mechanism 32 of angular velocity change mechanism 10 is changed to a speed increasing ratio suited to the dividing number.

In each embodiment described above, the gear diameter of the gear acting as the engageable element 2 of driven rotor 3 is the same as the gear diameter of the partial gear acting as the engaging element 4 of driving rotor 6. However, the gear diameter of the gear acting as the engageable element 2 of driven rotor 3 may be different from the gear diameter of the partial gear acting as the engaging element 4 of driving rotor 6.

The engageable element 2 and rotating element 13 constituting the driven rotor 3 may be integrated The engaging unit 4 and the female cam member 22 of cam 5 constituting the driving rotor 6 may be integrated.

The engaging element 4 of driving rotor 6 may be in the form of a partial gear defining teeth 4a in two or more positions at predetermined intervals in the circumferential direction.

The material of driven rotor 3, driving rotor 6, and balls 24 acting as rolling elements is not limited to high-carbon chromium bearing steel (SUJ2), but may be stainless steel, hard plastic or the like.

In the preferred embodiments described above, the size and shape of elliptic gears 27, 28 constituting the non-circular gear mechanism 29 of angular velocity change mechanism 10 may be varied as appropriate according to the nature of an indexing process at the processing apparatus E, to rotate the driven rotor 3 intermittently at an angular velocity suited to the nature of the indexing process.

What is claimed is:

1. An intermittent transmission mechanism, comprising:
   a driving rotor supported to be rotatable about an axis of an input shaft;
   a driven rotor supported to be rotatable about an axis of an output shaft parallel to the axis of the input shaft, the driven rotor including a member defining arcuate recesses and including an engageable element, wherein the driving rotor includes an engaging element for engaging the engageable element of the driven rotor to rotate the driven rotor intermittently by a predetermined angle; and
   a cam with a rotation regulating surface movable relative to and along arcuate surfaces of the recesses when the driven rotor is stopped,
   wherein the engaging element of the driving rotor is displaced relative to the rotation regulating surface axially of the input shaft,
   wherein the engageable element of the driven rotor is displaced relative to the member defining the recesses axially of the output shaft,
   wherein the engageable element of the driven rotor is a gear defining teeth arranged at predetermined intervals throughout a circumference thereof,
   wherein the engaging element of the driving rotor is a partial gear having teeth for meshing with the gear, and
   wherein the input shaft of the driving rotor has an angular velocity change mechanism connected thereto for minimizing an angular velocity of the driven rotor when the engaging element of the driving rotor begins to engage the engageable element of the driven rotor and when the engaging element ends the engagement.

2. The intermittent transmission mechanism as defined in claim 1, wherein the cam of the driving rotor defines an annular groove for holding a plurality of rolling elements to be rotatable, for rolling circulation, and for contacting the arcuate surfaces of the recesses of the driven rotor.

3. The intermittent transmission mechanism as defined in claim 2, wherein the annular groove is defined in a relative rotation allowing surface portion of a circumferential surface of the cam, with the relative rotation allowing surface allowing rotation relative to the driven rotor such that the rolling elements from the annular groove are not exposed in a time of intermittent rotation of the driven rotor when the engageable element is engaged by the engaging element.

4. The intermittent transmission mechanism as defined in claim 3, wherein the rolling elements are balls.

5. The intermittent transmission mechanism as defined in claim 2, wherein the rolling elements are balls.

6. The intermittent transmission mechanism as defined in claim 1, wherein the arcuate surfaces of the non-driven recesses of the driven rotor define guide grooves for receiving the rolling elements.

7. The intermittent transmission mechanism as defined in claim 6, wherein the annular groove is defined in a relative rotation allowing surface portion of a circumferential surface of the cam, with the relative rotation allowing surface allowing rotation relative to the driven rotor such that the rolling elements from the annular groove are not exposed in a time of intermittent rotation of the driven rotor when the engageable element is engaged by the engaging element.

8. The intermittent transmission mechanism as defined in claim 6, wherein the rolling elements are balls.

9. The intermittent transmission mechanism as defined in claim 1, wherein the partial gear of the engaging element has a plurality of teeth.

10. The intermittent transmission mechanism as defined in claim 1, wherein the member defining the recesses of the driven rotor has a plurality of recesses formed in a circumferential direction and is positioned adjacent the engageable element axially of the output shaft.

11. The intermittent transmission mechanism as defined in claim 1, wherein the member defining the recesses is fixed to the engageable element with bolts whereby the member and the engageable element are rotatable together.

12. An intermittent transmission mechanism, comprising:

a driving rotor supported to be rotatable about an axis of an input shaft;

a driven rotor supported to be rotatable about an axis of an output shaft parallel to the axis of the input shaft, the driven rotor including a member defining arcuate recesses and including an engageable element, wherein the driving rotor includes an engaging element for engaging the engageable element of the driven rotor to rotate the driven rotor intermittently by a predetermined angle; and a cam with a rotation regulating surface movable relative to and along arcuate surfaces of the recesses when the driven rotor is stopped, wherein the engaging element of the driving rotor is displaced relative to the rotation regulating surface axially of the input shaft, wherein the engageable element of the driven rotor is displaced relative to the member defining the recesses axially of the output shaft, wherein the engageable element of the driven rotor is a gear defining teeth arranged at predetermined intervals throughout a circumference thereof, wherein the engaging element of the driving rotor is a partial gear having teeth for meshing with the gear; and wherein the input shaft of the driving rotor has an angular velocity change mechanism connected thereto for reducing an angular velocity of the driven rotor at least when the engaging element of the driving rotor begins to engage the engageable element of the driven rotor to be lower than the angular velocity of the driven rotor at a point of time between beginning and end of the engagement.

\* \* \* \* \*